July 4, 1933.  G. WIETZEL ET AL  1,916,594
PRODUCTION OF PHOSPHORIC ACID AND HYDROGEN
Filed Sept. 9, 1929
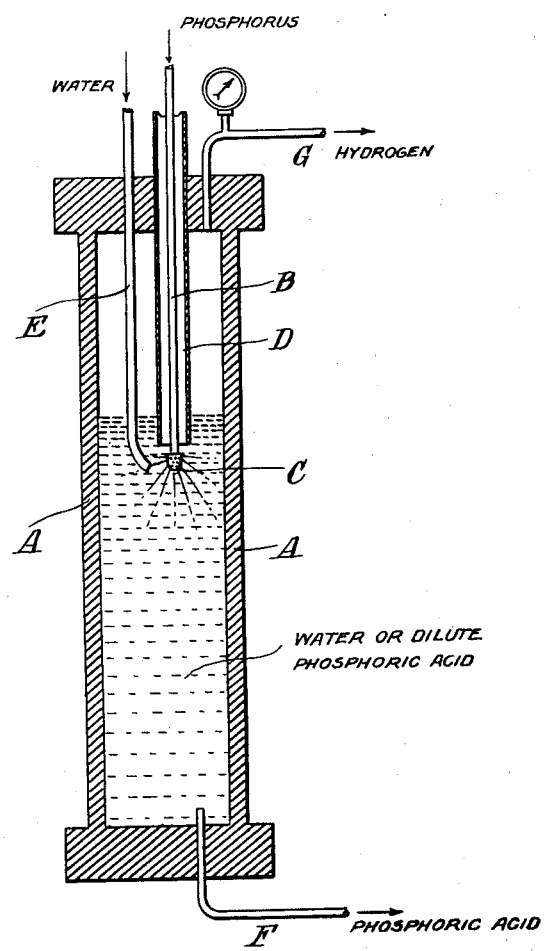
Gustav Wietzel
Gustav Pauckner
INVENTORS
BY *Harff Harland*
ATTORNEYS.

Patented July 4, 1933

1,916,594

UNITED STATES PATENT OFFICE

GUSTAV WIETZEL AND GUSTAV PAUCKNER, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PRODUCTION OF PHOSPHORIC ACID AND HYDROGEN

Application filed September 9, 1929, Serial No. 391,511, and in Germany October 16, 1928.

The present invention relates to the production of phosphoric acid and hydrogen. In the process according to the present invention both, the phosphorus and the water, are present in the reaction chamber in the liquid state.

It is already known that phosphorus can be converted with water at elevated temperatures and under pressure with the formation of acids of phosphorus. When the conversion is carried out in a pressure tight reaction vessel only a part of the phosphorus, however, is converted into acids of phosphorus. This drawback is mainly due to the fact that a large part of the phosphorus is changed into red phosphorus which adheres to the bottom of the vessel and which in the coherent form can only be converted with difficulty with water.

Thus, if it is desired that the duration of the total conversion of the phosphorus shall not be extended for too long a period of time or if it is desired to avoid a clogging of the vessel, the red phosphorus must be removed from time to time, and this operation, in consequence of the adhesive power and hardness of the red phosphorus, is difficult and wastes time.

We have now found that the said process can be advantageously carried out when avoiding the formation of red phosphorus in a coherent form. This may be effected by bringing the phosphorus introduced into the reaction chamber at once into intimate contact with the water, that is by finely distributing the phosphorus in the water. For example, the process in accordance with the present invention may be carried out by introducing phosphorus and water in small quantities either continuously or periodically into a pressure tight vessel heated, for example, to a temperature of 300° centigrade and under a pressure of, for example, from 150 to 300 atmospheres, so that the phosphorus and water react with each other in a short period of time and before the formation of red phosphorus occurs. Larger quantities of phosphorus and water may also be introduced and they may be finally dispersed and mixed with each other by stirring, thus removing the possibility of the deposition of the phosphorus which would lead to the conversion of the same into red phosphorus. The most suitable temperature ranges generally between about 240° and 500° centigrade and the pressure should generally be at least 50 atmospheres. The hydrogen and the phosphoric acid produced are drawn off under pressure either continuously or periodically. By operating according to the present invention it is possible to convert the whole of the phosphorus, to dispense with the time wasting opening and cleaning of the pressure tight reaction vessel and to avoid the clogging of the vessel and the inlet and outlet conduits.

Avoiding the formation of red phosphorus in a coherent form is further assisted by heating the phosphorus very rapidly to a temperature at which it reacts rapidly with the water, for example, to between 300° and 400° centigrade. Thereby the phosphorus is brought rapidly through that range of temperatures, namely temperatures below 300° C., where conversion into red phosphorus takes place at a comparatively high speed, while the speed of the interaction of the yellow phosphorus with the water is still rather low. Above 300° C. the conversion of the yellow phosphorus with the water proceeds so rapidly that red phosphorus can no longer be formed. In order to reduce the time required for the reaction still further, it is preferable to supply the phosphorus to be converted in a state of fine distribution. For example, it is very advantageous to supply the phosphorus from above by means of nozzles about 1 millimeter in width in the form of a fine jet into the water heated to between 300° and 400° centigrade. Thereby the phosphorus is rapidly heated to the reaction temperature and converted, before it reaches the bottom of the reaction vessel and before the formation of red phosphorus in a coherent state can take place. The same result is obtained by spraying the phosphorus within the water by means of a suitable nozzle.

In the accompanying drawing an apparatus suitable for carrying out the process according to the present invention is diagrammatically shown in vertical section. A high pressure vessel A is partly filled with water or dilute phosphoric acid. Liquid phosphorus is supplied by means of a tube B, provided with a heating packet D or other heating means, to below the surface of the liquid and is dispersed in the liquid by means of a nozzle C. Simultaneously water is introduced into the reaction vessel by means of a pipe E. The phosphoric acid formed is withdrawn from the vessel by means of a pipe F and the hydrogen by a pipe G.

The following examples will further illustrate the nature of the present invention, but the invention is not limited to these examples.

Example 1

A vertical high-pressure vessel, 5 meters in height and 100 millimeters in diameter, is filled to the extent of two thirds of its volume with water or dilute phosphoric acid and heated to between 300° and 400° centigrade, whereby a pressure between 85 and 150 atmospheres is set up. 3 kilograms of phosphorus are continuously introduced per hour to below the surface of the liquid and simultaneously 12 kilograms of water are added, the hydrogen and phosphoric acid produced by the reaction being continuously withdrawn. In order to secure fine division of the phosphorus, the latter is caused to pass into the liquid by way of holes or bores, 1 millimeter in diameter. The phosphorus is distributed in the whole amount of liquid in which it sinks slowly downwards and in which complete conversion into phosphoric acid and hydrogen takes place before the phosphorus has reached the bottom of the vessel.

Example 2

In a high-pressure vessel of 25 litres capacity, filled with 16 litres of water or phosphoric acid and heated to 350° C., 3 kilograms of phosphorus are finely divided below the surface of the liquid by means of a single nozzle to which the phosphorus is supplied under and over pressure of for example 10 atmospheres. The nozzle is so constructed that the phosphorus is finely dispersed in every possible direction. In view of the large surface of the fine phosphorus droplets oxidation to phosphoric acid and formation of hydrogen take place very rapidly and completely. The pressure initially amounting to about 100 atmospheres increases rapidly, and so much hydrogen is continuously withdrawn from the apparatus that the pressure therein does not exceed 200 atmospheres.

Example 3

3 kilograms of phosphorus are introduced per hour through 1 or more nozzles, 1 or 2 millimetres in diameter to below the surface of 17 litres of water or phosphoric acid contained in a high-pressure vessel of 30 litres capacity. The phosphorus leaving the nozzles is brought into contact with the water which has been heated to between 300° and 350° centigrade. Initially the water vapour in the vessel has a pressure of about 120 atmospheres. Thereby the phosphorus is rapidly heated to the most favourable reaction temperature of about 320° centigrade from the temperature at which it is introduced, namely about 100° centigrade. The phosphorus is rapidly converted into phosphoric acid and hydrogen before red phosphorus can be formed.

Example 4

500 grams of phosphorus and 2 litres of water are introduced into a high pressure vessel of 10 litres capacity heated to about 300° centigrade and intimately mixed with each other by means of a stirrer. The phosphorus is completely converted into phosphoric acid and hydrogen by the continuous intimate contact with water. A pressure of about 300 atmospheres is maintained in the vessel.

Example 5

In a high-pressure vessel as described in Example 1 and filled to about two thirds of its volume with water or phosphoric acid heated to about 350° C. and in which there is a pressure of about 85 atmospheres, 4 kilograms of phosphorus heated to about 100° centigrade are introduced per hour into the liquid through one or more nozzles, 1 millimeter in diameter. Shortly before the nozzle 12 kilograms of water having a temperature of about 300–350° centigrade are supplied per hour to the phosphorus; thereby an intimate mixing of the phosphorus and water leaving the nozzles occurs, which mixture has the reaction temperature of about 350° centigrade. Simultaneously this mixture is finely distributed in the liquid contained in the vessel, whereby quantitative conversion is obtained.

What we claim is:

1. The process of producing phosphoric acid by interaction of liquid water and liquid phosphorus which comprises thoroughly disseminating the liquid phosphorus in the water and rapidly heating the phosphorus to above 240° C. under pressure to prevent the formation of red phosphorus in coherent form.

2. The process of producing phosphoric acid by interaction of liquid water and liquid phosphorus which comprises spraying the liquid phosphorus into water heated to above 240° C. under pressure to thoroughly disseminate the phosphorus in the water and prevent the formation of red phosphorus in coherent form.

3. The process of producing phosphoric acid by interaction of liquid water and liquid phosphorus which comprises spraying the liquid phosphorus beneath the surface of a body of water heated to a temperature of 240 to 500° C. under a pressure of 50 atmospheres to thoroughly disseminate the phosphorus in the water and prevent the formation of red phosphorus in coherent form.

4. The process of producing phosphoric acid by interaction of liquid water and liquid phosphorus which comprises thoroughly disseminating the liquid phosphorus in the water and rapidly heating the phosphorus to above 240° C. under a pressure of at least 50 atmospheres to prevent the formation of red phosphorus in coherent form.

5. The process of producing phosphoric acid by interaction of liquid water and liquid phosphorus which comprises spraying the liquid phosphorus beneath the surface of a body of water heated to a temperature of 240 to 500° C. under a pressure of at least 50 atmospheres to thoroughly disseminate the phosphorus in the water and prevent the formation of red phosphorus in coherent form.

In testimony whereof we have hereunto set our hands.

GUSTAV WIETZEL.
GUSTAV PAUCKNER.